(12) United States Patent
Takeguchi (10) Patent No.: US 9,287,574 B2
(45) Date of Patent: Mar. 15, 2016

(54) POLYMER ELECTROLYTE FUEL CELL AND FUEL CELL SYSTEM INCLUDING THE SAME

(75) Inventor: Shinsuke Takeguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/701,796

(22) PCT Filed: Mar. 2, 2012

(86) PCT No.: PCT/JP2012/001469
§ 371 (c)(1),
(2), (4) Date: Dec. 3, 2012

(87) PCT Pub. No.: WO2013/042283
PCT Pub. Date: Mar. 28, 2013

(65) Prior Publication Data
US 2013/0122397 A1    May 16, 2013

(51) Int. Cl.
*H01M 8/10* (2006.01)
*H01M 8/02* (2006.01)
*H01M 8/24* (2006.01)

(52) U.S. Cl.
CPC .......... *H01M 8/1018* (2013.01); *H01M 8/0263* (2013.01); *H01M 8/0267* (2013.01); *H01M 8/241* (2013.01); *H01M 2008/1095* (2013.01); *Y02E 60/50* (2013.01)

(58) Field of Classification Search
CPC combination set(s) only.
See application file for complete search history.

(56) References Cited

U.S. PATENT DOCUMENTS

| 2004/0157103 A1* | 8/2004 | Takeguchi et al. ............. 429/32 |
| 2005/0031934 A1 | 2/2005 | Tanaka et al. |
| 2005/0186459 A1* | 8/2005 | Sugiura et al. ................. 429/26 |

(Continued)

FOREIGN PATENT DOCUMENTS

| JP | 2000-164230 A | 6/2000 |
| JP | 2002-015751 A | 1/2002 |

(Continued)

OTHER PUBLICATIONS

International Search Report mailed Jun. 12, 2012 issued in corresponding International Application No. PCT/JP2012/001469.

(Continued)

*Primary Examiner* — Ula C Ruddock
*Assistant Examiner* — Osei Amponsah
(74) *Attorney, Agent, or Firm* — McDermott Will & Emery LLP (57) ABSTRACT

A polymer electrolyte fuel cell according to the present invention includes: an electrolyte layer-electrode assembly (5); a first separator (6A) provided with a first reaction gas flowing region; and a second separator (6B) provided with a second reaction gas flowing region. In the first separator (6A), among one or more first turn portions (28), at least one first turn portion (28) is provided with a first recess (48) and first projections (58). In the second separator (6B), among one or more second turn portions (29), at least one second turn portion (29) is provided with a second recess (49) and second projections (59). When seen in the thickness direction of the first separator (6A), an overlap area is less than or equal to 5% of a gross area, the overlap area being a total overlap area between the first and second recesses (48, 49), the gross area being the total of the following areas: the area of all the first recesses (48); and the area of all the second recesses (49).

5 Claims, 6 Drawing Sheets

(56) References Cited

U.S. PATENT DOCUMENTS

| | | |
|---|---|---|
| 2007/0298311 A1 | 12/2007 | Zeng et al. |
| 2009/0162717 A1* | 6/2009 | Nakagawa et al. ............ 429/30 |
| 2009/0162727 A1* | 6/2009 | Kusakabe et al. ............. 429/34 |
| 2010/0035108 A1* | 2/2010 | Sugiura et al. ................ 429/26 |
| 2012/0231373 A1 | 9/2012 | Kusakabe et al. |

FOREIGN PATENT DOCUMENTS

| | | |
|---|---|---|
| JP | 2007-048486 A | 2/2007 |
| JP | 2007-207744 A | 8/2007 |
| JP | 2008-010179 A | 1/2008 |
| JP | 2008-130352 A | 6/2008 |
| JP | 2008-153095 A | 7/2008 |
| JP | 2009-199882 A | 9/2009 |
| WO | WO-2011/064961 A1 | 6/2011 |

OTHER PUBLICATIONS

Extended European Search Report dated Jan. 26, 2015, issued in corresponding European Application No. 12790778.0. 7 pgs.

* cited by examiner

POLYMER ELECTROLYTE FUEL CELL AND FUEL CELL SYSTEM INCLUDING THE SAME

RELATED APPLICATIONS

This application is the U.S. National Phase under 35 U.S.C. §371 of International Application No. PCT/JP2012/001469, filed on Mar. 2, 2012, which in turn claims the benefit of Japanese Application No. 2011-206186, filed on Sep. 21, 2011, the disclosures of which Applications are incorporated by reference herein.

TECHNICAL FIELD

The present invention relates to a polymer electrolyte fuel cell and a fuel cell system including the same, and particularly to the configuration of separators of the polymer electrolyte fuel cell.

BACKGROUND ART

A polymer electrolyte fuel cell (hereinafter, referred to as PEFC) is configured to cause an electrochemical reaction between a fuel gas containing hydrogen and an oxidizing gas containing oxygen such as air, thereby generating electric power and heat at the same time. A single cell of PEFC includes: a MEA (Membrane-Electrode-Assembly) including a polymer electrolyte membrane and a pair of gas diffusion electrodes (an anode and a cathode); gaskets; and electrically conductive plate-shaped separators.

Main surfaces of the separators are provided with manifold holes (reaction gas supply manifold holes and reaction gas discharge manifold holes) forming manifolds serving to supply and discharge the fuel gas and the oxidizing gas (these gases are referred to as reaction gases). Among the main surfaces, those in contact with the gas diffusion electrodes are provided with groove-shaped serpentine reaction gas channels, through which the reaction gases flow and which are in communication with the manifold holes.

There is a known fuel cell separator and a fuel cell in which such serpentine reaction gas channels include a turn portion provided with a recess in which a power generation gas is mixed. In the recess, a plurality of island-shaped projections rising from the bottom surface of the recess are arranged (see Patent Literature 1, for example).

In the fuel cell separator and the fuel cell disclosed in Patent Literature 1, the projections are arranged on the extension of channel grooves, and therefore, the power generation gas can be suitably mixed.

CITATION LIST

Patent Literature

PTL 1: Japanese Laid-Open Patent Application Publication No. 2007-48486

SUMMARY OF INVENTION

Technical Problem

However, the inventors of the present invention have found that even in the fuel cell separator and the fuel cell disclosed in Patent Literature 1, there is still room for improvement in terms of improving the cell performance when generating electric power by using reaction gases that are supplied with low humidity.

Specifically, in a case where reaction gases with low humidity are used, a reaction occurs at portions (ribs) of the separator that are in contact with a gas diffusion layer, at which portions water produced due to electric power generation tends to remain. In the fuel cell disclosed in Patent Literature 1, the area of contact between the gas diffusion layer and the projections in the recess is less than the area of contact between the gas diffusion layer and other regions (e.g., ribs). For this reason, electric power generation occurs at the projections in the recess in a more concentrated manner as compared to the other regions. Particularly great concentration of electric power generation is observed at a portion where the recess provided in one separator and the recess provided in the other separator overlap when seen in a stacking direction of the fuel cells. Accordingly, there is a risk that the amount of generated heat increases, which may result in degradation of the polymer electrolyte membrane.

The present invention has been made in view of the above-described problems. An object of the present invention is to provide a polymer electrolyte fuel cell and a fuel cell system including the polymer electrolyte fuel cell, which are capable of reducing electrical contact resistance between the separators and electrodes as compared to conventional fuel cells, thereby suppressing degradation of the polymer electrolyte membrane.

Solution to Problem

In order to solve the above-described problems, a polymer electrolyte fuel cell according to the present invention includes: an electrolyte layer-electrode assembly including an electrolyte layer and a pair of electrodes sandwiching the electrolyte layer; a plate-shaped electrically conductive first separator disposed so as to be in contact with one electrode of the pair of electrodes of the electrolyte layer-electrode assembly, wherein one main surface of the first separator is in in contact with the one electrode, the one main surface being provided with a first reaction gas flowing region which is formed in a winding shape and through which a first reaction gas flows, the first reaction gas flowing region including a plurality of groove-shaped first straight line portions and one or more first turn portions; and a plate-shaped electrically conductive second separator disposed so as to be in contact with another electrode of the pair of electrodes of the electrolyte layer-electrode assembly, wherein one main surface of the second separator is in contact with the other electrode, the one main surface being provided with a second reaction gas flowing region which is formed in a winding shape and through which a second reaction gas flows, the second reaction gas flowing region including a plurality of groove-shaped second straight line portions and one or more second turn portions. In the first separator, among the one or more first turn portions, at least one first turn portion is provided with a first recess and a plurality of first projections rising from a bottom surface of the first recess. In the second separator, among the one or more second turn portions, at least one second turn portion is provided with a second recess and a plurality of second projections rising from a bottom surface of the second recess. When seen in a thickness direction of the first separator, an overlap area is less than or equal to 5% of a gross area, the overlap area being a total overlap area between the first and second recesses provided in the first and second separators, the gross area being a total of the following areas:

an area of all the first recesses provided in the first separator; and an area of all the second recesses provided in the second separator.

Accordingly, electrical contact resistance between the separators and electrodes at the turn portions provided with the recesses and projections can be reduced as compared to conventional fuel cells.

A fuel cell system according to the present invention includes: the above polymer electrolyte fuel cell; a first reaction gas supply device configured to supply the first reaction gas to the first reaction gas flowing region; a second reaction gas supply device configured to supply the second reaction gas to the second reaction gas flowing region; a cooling medium supply device configured to supply a cooling medium to a cooling medium flowing region; and a controller configured to control the first reaction gas supply device, the second reaction gas supply device, and the cooling medium supply device, such that a dew point of the first reaction gas supplied to the first reaction gas flowing region and a dew point of the second reaction gas supplied to the second reaction gas flowing region become lower than a temperature of the cooling medium supplied to the cooling medium flowing region.

Accordingly, particularly in a case where the reaction gases are supplied to the fuel cell with low humidity, electrical contact resistance between the separators and electrodes at the turn portions provided with the recesses and projections can be reduced as compared to conventional fuel cell systems.

The above object, other objects, features, and advantages of the present invention will be made clear by the following detailed description of preferred embodiments with reference to the accompanying drawings.

Advantageous Effects of Invention

The fuel cell and the fuel cell system including the fuel cell according to the present invention make it possible to reduce, as compared to conventional fuel cells, electrical contact resistance between the separators and electrodes at the turn portions provided with the recesses and projections.

DESCRIPTION OF EMBODIMENTS

Hereinafter, preferred embodiments of the present invention will be described with reference to the drawings. In the drawings, the same or corresponding components are denoted by the same reference signs, and a repetition of the same description is avoided. In the drawings, only the components necessary for describing the present invention are shown, and the other components are omitted. Further, the present invention is not limited to the embodiments described below.

(Embodiment 1)

A polymer electrolyte fuel cell according to Embodiment 1 serves as an example where the polymer electrolyte fuel cell includes: an electrolyte layer-electrode assembly including an electrolyte layer and a pair of electrodes sandwiching the electrolyte layer; a plate-shaped electrically conductive first separator disposed so as to be in contact with one electrode of the pair of electrodes of the electrolyte layer-electrode assembly, wherein one main surface of the first separator is in in contact with the one electrode, the one main surface being provided with a first reaction gas flowing region which is formed in a winding shape and through which a first reaction gas flows, the first reaction gas flowing region including a plurality of groove-shaped first straight line portions and one or more first turn portions; and a plate-shaped electrically conductive second separator disposed so as to be in contact another electrode of the pair of electrodes of the electrolyte layer-electrode assembly, wherein one main surface of the second separator is in contact with the other electrode, the one main surface being provided with a second reaction gas flowing region which is formed in a winding shape and through which a second reaction gas flows, the second reaction gas flowing region including a plurality of groove-shaped second straight line portions and one or more second turn portions. In the first separator, among the one or more first turn portions, at least one first turn portion is provided with a first recess and a plurality of first projections rising from a bottom surface of the first recess. In the second separator, among the one or more second turn portions, at least one second turn portion is provided with a second recess and a plurality of second projections rising from a bottom surface of the second recess. When seen in a thickness direction of the first separator, an overlap area is less than or equal to 5% of a gross area, the overlap area being a total overlap area between the first and second recesses provided in the first and second separators, the gross area being a total of the following areas: an area of all the first recesses provided in the first separator; and an area of all the second recesses provided in the second separator.

It should be noted that the overlap area is set to be less than or equal to 5% of the gross area from the standpoint of facilitating design changes of the first reaction gas flowing region or the second reaction gas flowing region. Further, the ratio of the overlap area to the gross area is preferably as low as possible in order to reduce electrical contact resistance between the separators and electrodes at the turn portions. For example, the ratio may be suitably set to 4% or less, 3% or less, 2% or less, 1% or less, etc.

In the polymer electrolyte fuel cell according to Embodiment 1, the first recess may be provided at an upstream portion of the first reaction gas flowing region.

In the polymer electrolyte fuel cell according to Embodiment 1, the second recess may be provided at an upstream portion of the second reaction gas flowing region.

In the polymer electrolyte fuel cell according to Embodiment 1, the first reaction gas flowing region and the second reaction gas flowing region may be configured such that the first reaction gas flowing region and the second reaction gas flowing region form parallel flows, and when seen in the thickness direction of the first separator, the first reaction gas flowing through the first straight line portions that overlap the one electrode first when the first reaction gas flowing region is followed from upstream to downstream, and the second reaction gas flowing through the second straight line portions that overlap the other electrode first when the second reaction gas flowing region is followed from upstream to downstream, flow in opposite directions to each other. The first recess may be provided at the first turn portion that overlaps the one electrode first when the first reaction gas flowing region seen in the thickness direction of the first separator is followed from upstream to downstream, and the second recess may be provided at the second turn portion that overlaps the other electrode first when the second reaction gas flowing region seen in a thickness direction of the second separator is followed from upstream to downstream.

In the polymer electrolyte fuel cell according to Embodiment 1, the number of provided second recesses may be greater than the number of provided first recesses.

In the polymer electrolyte fuel cell according to Embodiment 1, another main surface of at least one of the first and second separators, the other main surface not being in contact with any of the electrodes, may be provided with a cooling medium flowing region through which a cooling medium flows.

Hereinafter, one example of the polymer electrolyte fuel cell according to Embodiment 1 of the present invention is described with reference to the drawings.

[Configuration of Fuel Cell Stack]

Figure 1:
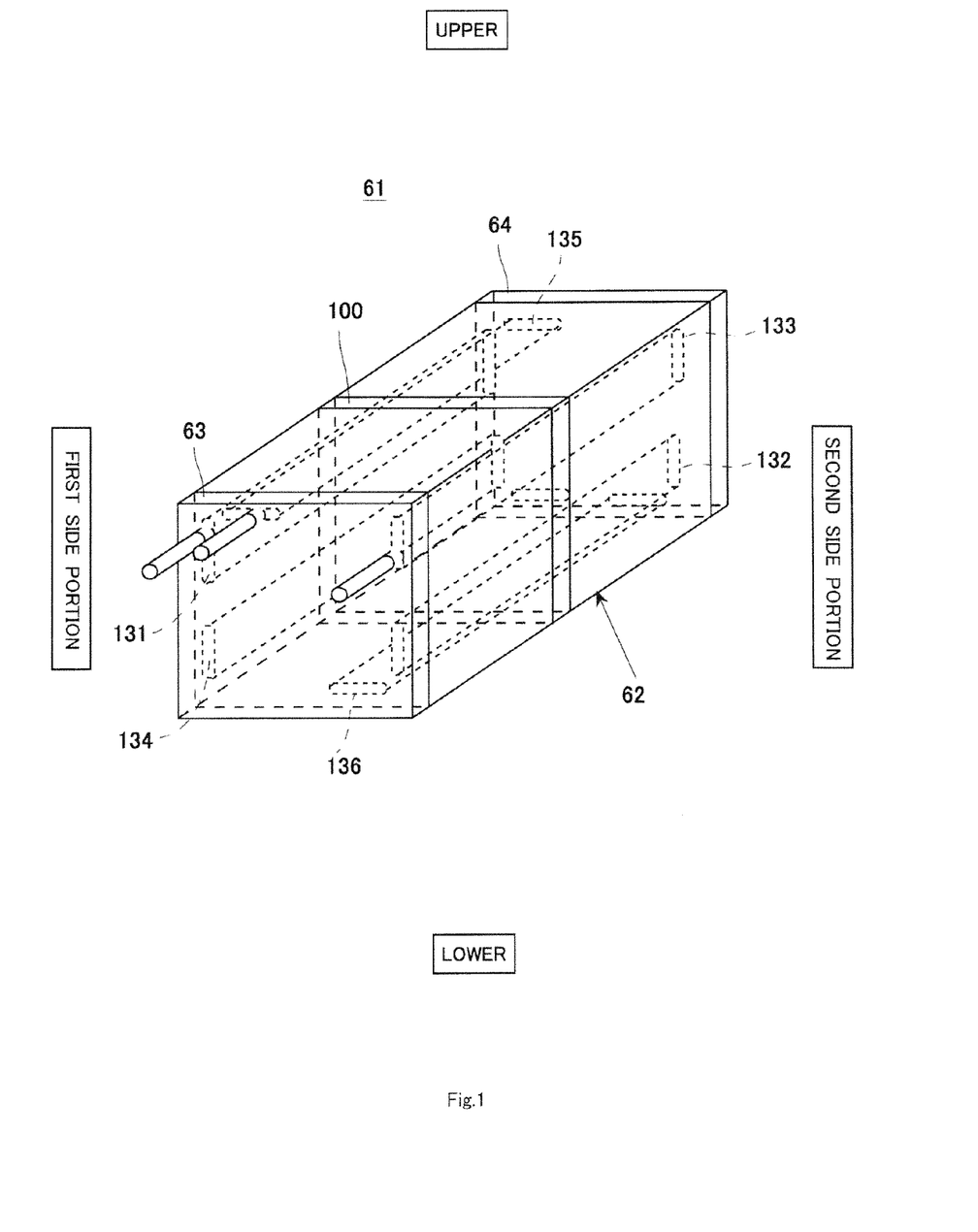
FIG. 1 is a perspective view showing a schematic configuration of a fuel cell stack including a polymer electrolyte fuel cell according to Embodiment 1.

FIG. 1 is a perspective view showing a schematic configuration of a fuel cell stack including the polymer electrolyte fuel cell (hereinafter, simply referred to as a fuel cell) according to Embodiment 1. It should be noted that the upper-lower direction in FIG. 1 represents the upper-lower direction in relation to the fuel cell stack.

As shown in FIG. 1, a fuel cell stack 61 according to Embodiment 1 includes a cell stacked body 62. The cell stacked body 62 is formed by stacking a plurality of fuel cells 100 in the thickness direction. End plates 63 and 64 are disposed at both ends of the cell stacked body 62, respectively. A current collector and an insulating plate are disposed between the end plate 63 and the cell stacked body 62, and between the end plate 64 and the cell stacked body 62 (not shown). The cell stacked body 62 and other components are fastened by fasteners which are not shown.

A fuel gas supply manifold 131 is provided in the upper part of one side portion (left side portion in the diagram; hereinafter, referred to as a first side portion) of the cell stacked body 62, such that the fuel gas supply manifold 131 extends through the cell stacked body 62 in the stacking direction of the fuel cells 100. An oxidizing gas discharge manifold 134 is provided below the fuel gas supply manifold 131. Further, in the upper part of the first side portion of the cell stacked body 62, a cooling medium supply manifold 135 is provided at a position that is inward from the position where the fuel gas supply manifold 131 is disposed. The cooling medium supply manifold 135 extends through the cell stacked body 62 in the stacking direction of the fuel cells 100.

An oxidizing gas supply manifold 133 is provided in the upper part of the other side portion (right side portion in the diagram; hereinafter, referred to as a second side portion) of the cell stacked body 62, such that the oxidizing gas supply manifold 133 extends through the cell stacked body 62 in the stacking direction of the fuel cells 100. A fuel gas discharge manifold 132 is provided below the oxidizing gas supply manifold 133 so as to extend through the cell stacked body 62 in the stacking direction of the fuel cells 100. Further, in the lower part of the second side portion of the cell stacked body 62, a cooling medium discharge manifold 136 is provided at a position that is inward from the position where the fuel gas discharge manifold 132 is disposed. The cooling medium discharge manifold 136 extends through the cell stacked body 62 in the stacking direction of the fuel cells 100.

Each manifold is provided with suitable piping. Accordingly, a fuel gas, an oxidizing gas, and a cooling medium are supplied to and discharged from the fuel cell stack 61 through suitable piping (see Embodiment 2). Although in Embodiment 1 the fuel cells 100 form a fuel cell stack of a so-called internal manifold type, the fuel cell stack adopted in Embodiment is not limited to the internal manifold type but may be an external manifold type.

[Configuration of Polymer Electrolyte Fuel Cell]

Next, a configuration of the polymer electrolyte fuel cell according to Embodiment 1 is described with reference to FIG. 2.

Figure 2:
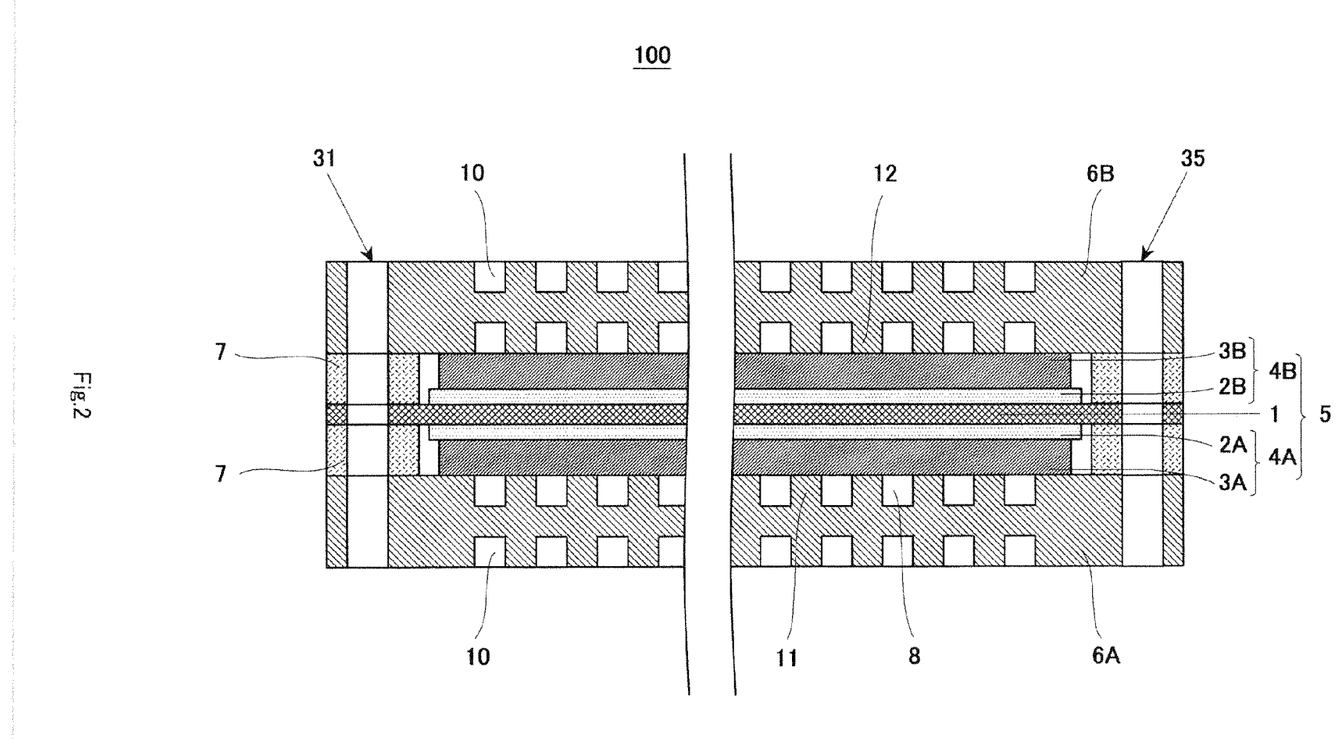
FIG. 2 is a cross-sectional view showing a schematic configuration of the fuel cell in the fuel cell stack shown I FIG. 1.

FIG. 2 is a cross-sectional view showing a schematic configuration of the fuel cell in the fuel cell stack shown in FIG. 1.

As shown in FIG. 2, the fuel cell 100 according to Embodiment 1 includes a MEA (Membrane-Electrode-Assembly) 5, gaskets 7, an anode separator (first separator) 6A, and a cathode separator (second separator) 6B.

The MEA 5 includes a polymer electrolyte membrane 1 which selectively transports hydrogen ion, an anode electrode 4A, and a cathode electrode 4B. The polymer electrolyte membrane 1 has a substantially quadrangular (here, rectangular) shape. The anode electrode 4A is provided on one surface of the polymer electrolyte membrane 1 and the cathode electrode 4B is provided on the other surface of the polymer electrolyte membrane 1, such that the anode electrode 4A and the cathode electrode 4B are positioned inward from the periphery of the polymer electrolyte membrane 1. It should be noted that manifold holes such as a fuel gas supply manifold hole 31 and a cooling medium supply manifold hole 35 are formed so as to extend through the periphery of the polymer electrolyte membrane 1 in the thickness direction.

The anode electrode 4A is provided on one main surface of the polymer electrolyte membrane 1. The anode electrode 4A includes an anode catalyst layer 2A and an anode gas diffusion layer 3A. The anode catalyst layer 2A contains: catalyst-supporting carbon formed of carbon powder (electrically conductive carbon particles) supporting a platinum-based metal catalyst (electrocatalyst); and a polymer electrolyte adhered to the catalyst-supporting carbon. The anode gas diffusion layer 3A has gas permeability and electrical conductivity. The anode catalyst layer 2A is disposed such that its one main surface is in contact with the polymer electrolyte membrane 1. The anode gas diffusion layer 3A is disposed on the other main surface of the anode catalyst layer 2A.

Similarly, the cathode electrode 4B is provided on the other main surface of the polymer electrolyte membrane 1. The cathode electrode 4B includes a cathode catalyst layer 2B and a cathode gas diffusion layer 3B. The cathode catalyst layer 2B contains: catalyst-supporting carbon formed of carbon powder (electrically conductive carbon particles) supporting a platinum-based metal catalyst (electrocatalyst); and a polymer electrolyte adhered to the catalyst-supporting carbon. The cathode gas diffusion layer 3B is provided on the cathode catalyst layer 2B, and has gas permeability and electrical conductivity. The cathode catalyst layer 2B is disposed such that its one main surface is in contact with the polymer electrolyte membrane 1. The cathode gas diffusion layer 3B is disposed on the other main surface of the cathode catalyst layer 2B.

It should be noted that, in Embodiment 1, the anode catalyst layer 2A is formed such that, when seen in the thickness direction of the anode separator 6A, the outer edge of the anode catalyst layer 2A is positioned outward (i.e., protrudes outward) from the outer edge of the anode gas diffusion layer 3A. Similarly, the cathode catalyst layer 2B is formed such that the outer edge of the cathode catalyst layer 2B is positioned outward (i.e., protrudes outward) from the outer edge of the cathode gas diffusion layer 3B. However, the manner in which the anode catalyst layer 2A and the cathode catalyst layer 2B are formed is not limited to this. As an alternative, the anode catalyst layer 2A may be formed such that its outer edge is positioned inward from the anode gas diffusion layer 3A, and the cathode catalyst layer 2B may be formed such that its outer edge is positioned inward from the cathode gas diffusion layer 3B.

A pair of fluorine rubber doughnut-shaped gaskets 7 are disposed so as to sandwich the polymer electrolyte membrane 1, such that the gaskets 7 surround the anode electrode 4A and the cathode electrode 4B (to he exact, the anode gas diffusion layer 3A and the cathode gas diffusion layer 3B) of the MEA 5. This prevents fuel gas leakage and oxidizing gas leakage to the outside of the cell, and also prevents these gases from being mixed with each other in the fuel cell 100. It should be noted that manifold holes such as the fuel gas supply manifold hole 31 and the cooling medium supply manifold hole 35, which are through-holes extending in the thickness direction, are formed through the periphery of the gaskets 7.

The anode separator 6A and the cathode separator 6B, which are electrically conductive separators, are disposed so as to sandwich the MEA 5 and the gaskets 7. In this manner, the MEA 5 is mechanically fixed. Accordingly, when a plurality of fuel cells 100 are stacked in the thickness direction, the MEA 5 of each fuel cell 100 is electrically connected. It should be noted that a metal having excellent thermal conductivity and electrical conductivity, graphite, or a graphite-resin mixture can be used for the anode separator 6A and the cathode separator 6B. For example, a mixture of carbon powder and a binder (solvent) prepared by injection molding, a titanium plate of which the surface is gold-plated, or a stainless steel plate of which the surface is gold-plated, can be used for the anode separator 6A and the cathode separator 6B.

One main surface of the anode separator 6A (hereinafter, referred to as an inner surface), the inner surface being in contact with the anode electrode 4A, is provided with a fuel gas flowing region 8 through which a fuel gas (first reaction gas) flows, and the other main surface (hereinafter, referred to as an outer surface) is provided with a groove-shaped cooling medium flowing region 10 through which a cooling medium flows. Similarly, one main surface of the cathode separator 6B (hereinafter, referred to as an inner surface), the inner surface being in contact with the cathode electrode 4B, is provided with an oxidizing gas flowing region 9 through which an oxidizing gas (second reaction gas) flows, and the other main surface (hereinafter, referred to as an outer surface) is provided with a groove-shaped cooling medium flowing region 10 through which the cooling medium flows.

It should be noted that manifold holes such as the fuel gas supply manifold hole 31 and the cooling medium supply manifold hole 35 are formed at the periphery of the main surfaces of each of the anode separator 6A and the cathode separator 6B. The shape of each cooling medium flowing region 10 may be any shape. For example, the cooling medium flowing region 10 may be formed in a straight shape, serpentine shape, or spiral shape. Further, regarding the cooling medium flowing region 10, it suffices when the outer surface of at least one of the anode separator 6A and the cathode separator 6B in each single fuel cell 100 is provided with the cooling medium flowing region 10.

With the above configuration, the fuel gas and the oxidizing gas are supplied to the anode electrode 4A and the cathode electrode 4B, respectively. These gases react with each other to generate electricity and heat, and water is produced, accordingly. The cooling medium such as cooling water is flowed through the cooling medium flowing region 10, and thereby the generated heat is recovered.

It should be noted that the fuel cell 100 configured as described above may be used as a single cell, or a plurality of fuel cells 100 may be stacked and used as the fuel cell stack 61.

[Configuration of Separator]

Next, the configurations of the anode separator 6A and the cathode separator 6B are described in more detail with reference to FIGS. 2 to 4.

Figure 3:
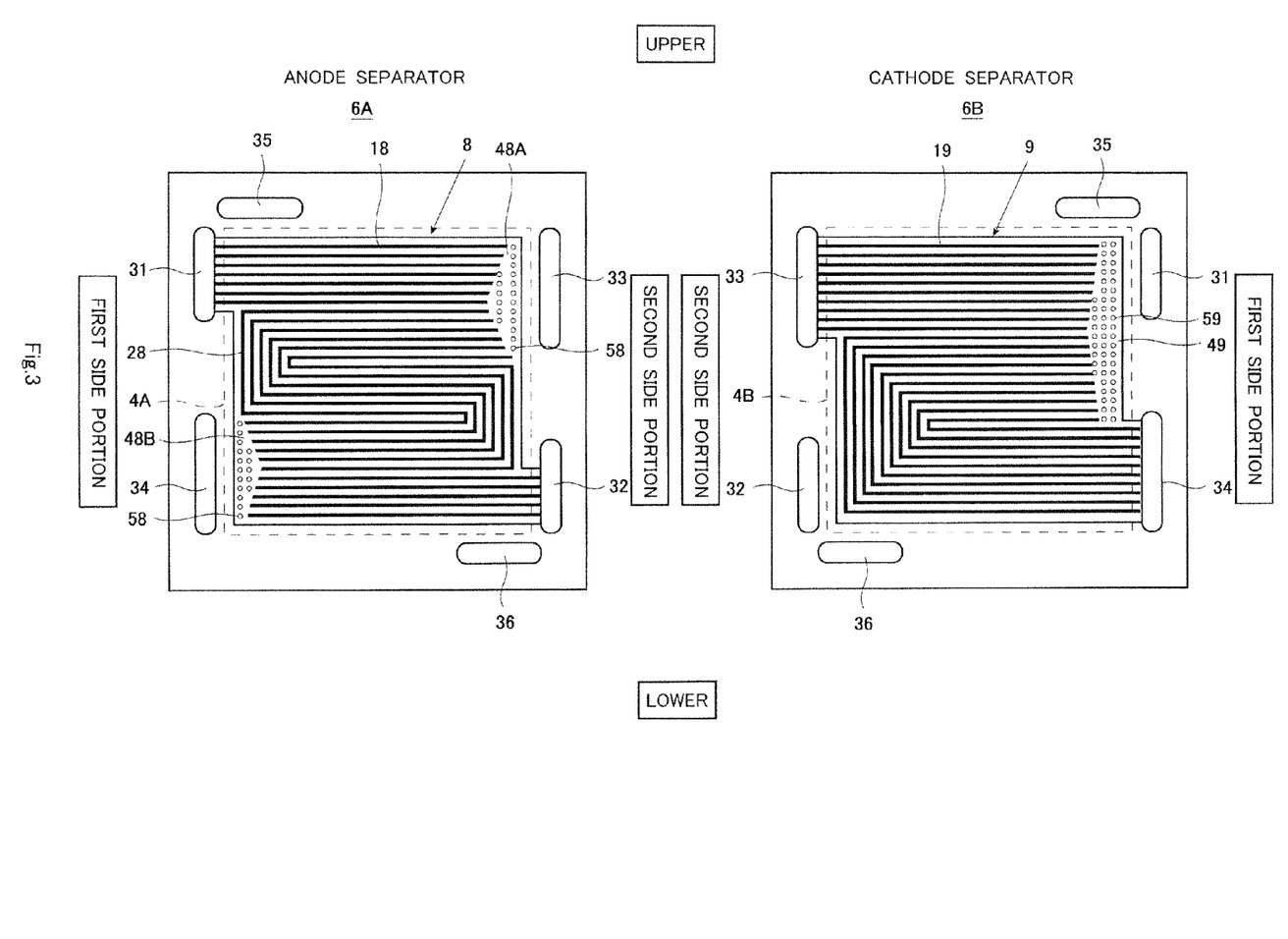
FIG. 3 is a schematic diagram showing schematic configurations of inner surfaces of anode and cathode separators in the polymer electrolyte fuel cell shown in FIG. 2.

FIG. 3 is a schematic diagram showing schematic configurations of the inner surfaces of the anode and cathode separators in the polymer electrolyte fuel cell shown in FIG. 2. FIG. 4 is a perspective view of the polymer electrolyte fuel cell shown in FIG. 2, which is seen in the thickness direction of the anode separator. It should be noted that the upper-lower direction in FIG. 3 represents the upper-lower direction in relation to the separators. Grooves through which the reaction gases flow are each indicated by a single bold line. In FIG. 4, grooves through which the reaction gases and the cooling medium flow are not shown; the first recess and the first projections are indicated by solid lines; the second recess and the second projections are indicated by dashed lines; and a portion where the first recess and the second recess overlap is indicated by hatching.

As shown in FIG. 3, the anode separator 6A is plate-shaped and substantially rectangular. A plurality of through-holes are formed at the periphery of the main surface of the anode separator 6A. These through-holes serve as manifold holes such as the fuel gas supply manifold hole 31.

Specifically, the fuel gas supply manifold hole 31 is formed in the upper part of one side portion (hereinafter, referred to as a first side portion) of the anode separator 6A. An oxidizing gas discharge manifold hole 34 is formed below the fuel gas supply manifold hole 31. Further, the cooling medium supply manifold hole 35 is formed at a position that is above and inward from the fuel gas supply manifold hole 31.

An oxidizing gas supply manifold hole 33 is formed in the upper part of the other side portion (hereinafter, referred to as a second side portion) of the anode separator 6A. A fuel gas discharge manifold hole 32 is formed below the oxidizing gas supply manifold hole 33. Further, a cooling medium discharge manifold hole 36 is formed at a position that is below and inward from the fuel gas discharge manifold hole 32.

Similarly, the cathode separator 6B is plate-shaped and substantially rectangular. A plurality of through-holes are formed at the periphery of the main surfaces of the cathode separator 6B. These through-holes serve as manifold holes such as the fuel gas supply manifold hole 31. Since the positional relationship among the manifold holes of the cathode separator 6B is the same as that of the anode separator 6A, the description thereof is omitted.

The inner surface of the anode separator 6A is provided with the fuel gas flowing region 8, which is formed in a winding shape so as to connect the fuel gas supply manifold hole 31 and the fuel gas discharge manifold hole 32. When seen in the thickness direction of the anode separator 6A, the overall fuel gas flowing region 8 is formed in a serpentine shape. The fuel gas flowing region 8 includes a plurality of groove-shaped first straight line portions 18 and one or more (in this example, four) first turn portions 28.

The first straight line portions 18 are formed as channel grooves through which the fuel gas flows (in a divided manner). The first turn portions 28 are formed such that the fuel gas flowing through the first straight line portions 18 turns around at the first turn portions 28. Among the one or more first turn portions 28, at least one first turn portion 28 is (in Embodiment 1, two first turn portions 28 are) provided with a first recess 48A and a first recess 48B (hereinafter, each of these first recesses may be simply referred to as a first recess 48).

Specifically, the first recess 48 is provided at the first turn portion 28 that overlaps the anode electrode 4A first when the fuel gas flowing region 8 seen in the thickness direction of the anode separator 6A is followed from the upstream side to the downstream side. The first recess 48 is also provided at the first turn portion 28 that overlaps the anode electrode 4A first when the fuel gas flowing region 8 seen in the thickness direction of the anode separator 6A is followed from the downstream side to the upstream side.

That is, the first recess 48A is provided at the first turn portion 28 that appears first when the fuel gas flowing region 8 seen in the thickness direction of the anode separator 6A is followed from the upstream side to the downstream side, and the first recess 48B is provided at the first turn portion 28 that appears fourth when the fuel gas flowing region 8 seen in the thickness direction of the anode separator 6A is followed from the upstream side to the downstream side.

It should be noted that the first recesses 48 may be provided at any positions and any number of first recesses 48 may be provided as long as, when seen in the thickness direction of the anode separator 6A, an overlap area described below is less than or equal to 5% of a gross area described below. The overlap area is a total overlap area between first and second recesses 48 and 49. The second recess 49 will be described below. The gross area is the total of the following areas: the area of all the first recesses 48 provided in the anode separator 6A; and the area of all the second recesses 49 provided in the cathode separator 6B.

For example, the first recess 48 may be provided only at an upstream portion of the fuel gas flowing region 8. The upstream portion of the fuel gas flowing region 8 herein refers to a portion, one end of which is the upstream end portion of the fuel gas flowing region 8 and the other end of which is a portion satisfying the following formula: $L1 \leq \{(1/2) \times L2\}$. The upstream portion extends between these portions. In the formula, L1 represents the channel length of the upstream portion of the fuel gas flowing region 8 and L2 represents the entire channel length of the fuel gas flowing region 8. More preferably, said other end of the upstream portion is a portion satisfying the following formula: $L1 \leq \{(1/3) \times L2\}$.

Each first recess 48 is formed so as to be in communication with channel grooves forming the first straight line portions 18. In each first recess 48, a plurality of first projections 58 are formed so as to extend from the bottom surface of the first recess 48 in the thickness direction of the anode separator 6A. The first projections 58 are each formed in a cylindrical shape (to be exact, a perfect circular cylindrical shape).

Each portion between the channel grooves forming the plurality of first straight line portions 18 serves as (i.e., demarcates) a first rib 11 which is in contact with the anode electrode 4A. In other words, each portion between the channel grooves forming the plurality of first straight line portions 18 is defined as the first rib 11 which is in contact with the anode electrode 4A.

Although in Embodiment 1 each first projection 58 is formed in a substantially cylindrical shape, the shape of the first projection 58 is not limited to this. The first projection 58 may be formed in the shape of a triangular or quadrangular prism. Further, in the above description, the first projection 58 is formed such that its cross section perpendicular to the thickness direction of the anode separator 6A is a perfect circle. However, the shape of the cross section is not limited to a perfect circle, but may be ellipsoidal.

Similarly, the one main surface of the cathode separator 6B is provided with the oxidizing gas flowing region 9, which is formed in a winding shape so as to connect the oxidizing gas supply manifold hole 33 and the oxidizing gas discharge manifold hole 34. When seen in the thickness direction of the cathode separator 6B, the overall oxidizing gas flowing region 9 is formed in a serpentine shape. The oxidizing gas flowing region 9 includes a plurality of groove-shaped second straight line portions 19 and one or more (in this example, two) second turn portions 29.

The second straight line portions 19 are formed as channel grooves through which the oxidizing gas flows (in a divided manner). The second turn portions 29 are formed such that the oxidizing gas flowing through the second straight line portions 19 turns around at the second turn portions 29. Among the one or more second turn portions 29, at least one second turn portion 29 (in Embodiment 1, one second turn portion 29) is provided with a second recess 49.

Specifically, the second recess 49 is provided at the second turn portion 29 that overlaps the cathode electrode 4B first (i.e., the second turn portion 29 that appears first) when the oxidizing gas flowing region 9 seen in the thickness direction of the cathode separator 6B is followed from the upstream side to the downstream side. It should be noted that the second recess 49 may be provided at any position and any number of second recesses 49 may be provided as long as, when seen in the thickness direction of the anode separator 6A, the overlap area is less than or equal to 5% of the gross area. The overlap area is a total overlap area between the first and second recesses 48 and 49. The gross area is the total of the following areas: the area of all the first recesses 48 provided in the anode separator 6A; and the area of all the second recesses 49 provided in the cathode separator 6B.

For example, the second recess 49 may be provided only at an upstream portion of the oxidizing gas flowing region 9. The upstream portion of the oxidizing gas flowing region 9 herein refers to a portion, one end of which is the upstream end portion of the oxidizing gas flowing region 9 and the other end of which is a portion satisfying the following formula: $L3 \leq \{(1/2) \times L4\}$. The upstream portion extends between these portions. In the formula, L3 represents the channel length of the upstream portion of the oxidizing gas flowing region 9 and L4 represents the entire channel length of the oxidizing gas flowing region 9. More preferably, said other end of the upstream portion is a portion satisfying the following formula: $L3 \leq \{(1/3) \times L4\}$.

Each second recess 49 is formed so as to be in communication with channel grooves forming the second straight line portions 19. In each second recess 49, a plurality of second projections 59 are formed so as to extend from the bottom surface of the second recess 49 in the thickness direction of the cathode separator 6B. The second projections 59 are each formed in a cylindrical shape (to be exact, a perfect circular cylindrical shape).

Each portion between the channel grooves forming the plurality of second straight line portions 19 serves as (i.e., demarcates) a second rib 12 which is in contact with the cathode electrode 4B. In other words, each portion between the channel grooves forming the plurality of second straight line portions 19 is defined as the second rib 12 which is in contact with the cathode electrode 4B.

Although in Embodiment 1 each second projection 59 is formed in a substantially cylindrical shape, the shape of the second projection 59 is not limited to this. The second projection may be formed in the shape of a triangular or quadrangular prism. Further, in the above description, the second projection 59 is formed such that its cross section perpendicular to the thickness direction of the cathode separator 6B is a perfect circle. However, the shape of the cross section is not limited to a perfect circle, but may be ellipsoidal.

The fuel gas flowing region 8 and the oxidizing gas flowing region 9 are configured such that they form parallel flows. The parallel flows herein mean that the overall flow direction of the fuel gas and the overall flow direction of the oxidizing gas from upstream to downstream coincide with each other when seen in the thickness direction of the fuel cell 100 with a broad view (overall view) although the fuel gas flowing region 8 and the oxidizing gas flowing region 9 have portions where the fuel gas and the oxidizing gas flow in the opposite directions to each other.

It should be noted that, in Embodiment 1, the fuel gas flowing region 8 and the oxidizing gas flowing region 9 are configured such that, when seen in the thickness direction of the anode separator 6A, the fuel gas flowing through the first straight line portions 18 that overlap the anode electrode 4A first when the fuel gas flowing region 8 is followed from upstream to downstream, and the oxidizing gas flowing through the second straight line portions 19 that overlap the cathode electrode 4B first when the oxidizing gas flowing region 9 is followed from upstream to downstream, flow in the opposite directions to each other.

Figure 4:
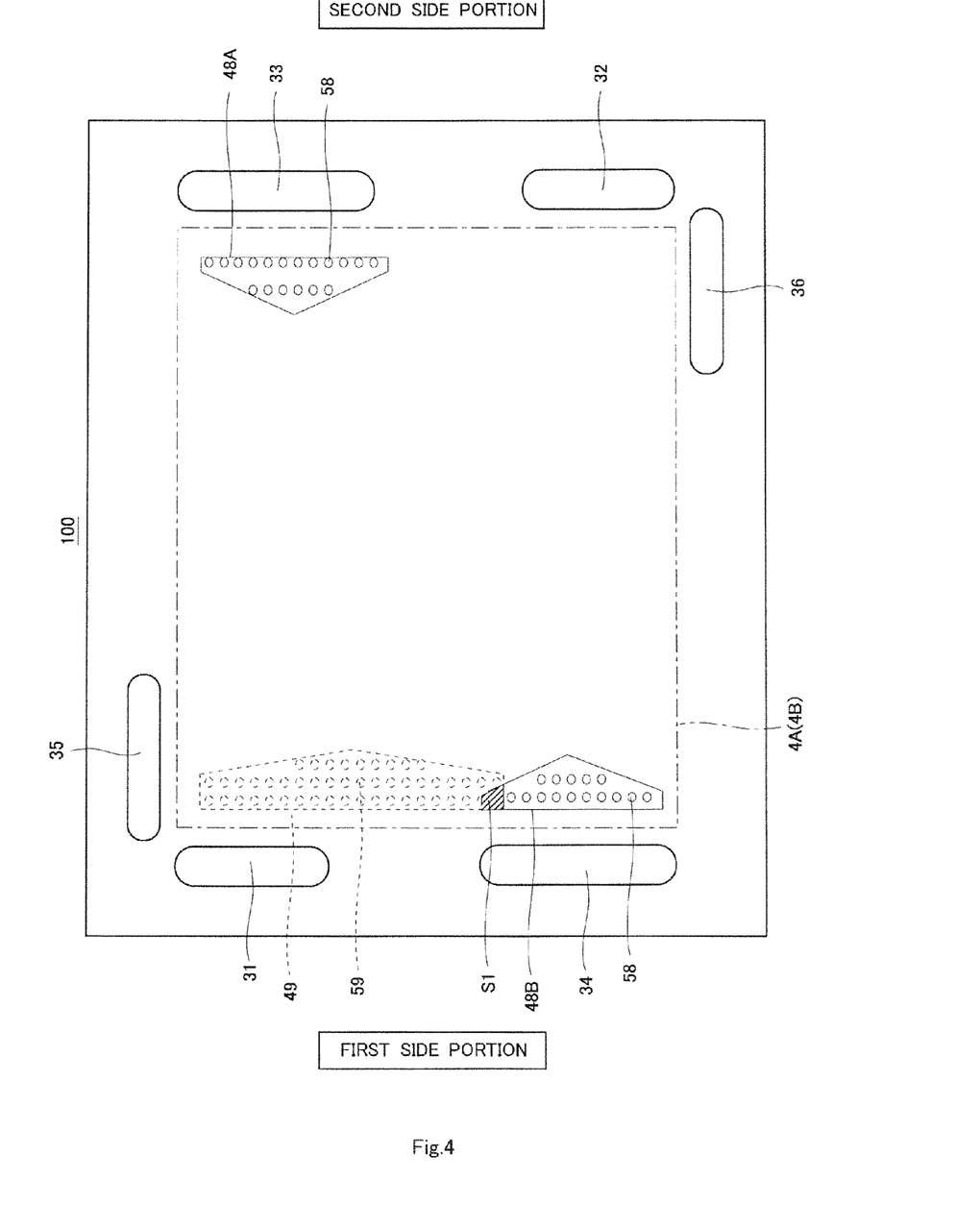
FIG. 4 is a perspective view of the polymer electrolyte fuel cell shown in FIG. 2, which is seen in the thickness direction of the anode separator.

As shown in FIG. 3 and FIG. 4, the first and second recesses 48 and 49 are disposed such that a portion S1, in which the first and second recesses 48 and 49 overlap when seen in the thickness direction of the anode separator 6A, is formed. More specifically, the first and second recesses 48 and 49 are disposed such that the area of the portion S1 (i.e., the overlap area) is less than or equal to 5% of a gross area S which is the total of the following areas: the area of all the first recesses 48 (the first recess 48A and the first recess 48B) provided in the anode separator 6A; and the area of all the second recesses 49 provided in the cathode separator 6B.

As described above, the fuel cell 100 according to Embodiment 1 is configured such that the area of the portion S1, in which the first recesses 48 provided in the anode separator 6A and the second recess 49 provided in the cathode separator 6B overlap, is less than or equal to 5% of the gross area S. As a result, a decrease in the area of portions where there is no contact between the cathode separator 6B and the cathode electrode 4B, and a decrease in the area of portions where there is no contact between the anode separator 6A and the anode electrode 4A, can be suppressed as compared to conventional fuel cells. This makes it possible to reduce electrical contact resistance and alleviate the concentration of electric power generation.

Further, in the fuel cell 100 according to Embodiment 1, the first recesses 48 are provided at the upstream portion. Therefore, particularly in a case where the fuel cell 100 is operated under low-humidity condition (where the dew point of the fuel gas flowing through the fuel gas flowing region 8 and the dew point of the oxidizing gas flowing through the oxidizing gas flowing region 9 are lower than the temperature of the cooling medium (here, water) flowing through the cooling medium channel 10), even if water generated due to the reaction of the reaction gases blocks any of the plurality of channels, the reaction gas can be supplied to the downstream side of the blocked channel by mixing and distributing the fuel gas at the first recesses 48. This makes it possible to prevent an occurrence of a situation where electric power cannot be generated due to insufficient supply of the fuel gas.

Similarly, in the fuel cell 100 according to Embodiment 1, the second recess 49 is provided at the upstream portion. Therefore, in a case where the fuel cell 100 is operated under low-humidity condition, even if water generated due to the reaction of the reaction gases blocks any of the plurality of channels, the reaction gas can be supplied to the downstream side of the blocked channel by mixing and distributing the oxidizing gas at the second recess 49. This makes it possible to prevent an occurrence of a situation where electric power cannot be generated due to insufficient supply of the oxidizing gas.

Further, in the fuel cell 100 according to Embodiment 1, the fuel gas flowing region 8 is formed such that the number of channels downstream from the first recess 48 (i.e., the number of first straight line portions 18 downstream from the first recess 48) is smaller than the number of channels upstream from the first recess 48 (i.e., the number of first straight line portions 18 upstream from the first recess 48). With this configuration, the mixing and distributing of the fuel gas at the first recess 48 can be more facilitated in a case where any of the plurality of channels is blocked as mentioned above. This makes it possible to further suppress degradation in the cell performance due to insufficient supply of the fuel gas.

Still further, according to Embodiment 1, the fuel gas flowing region 8 and the oxidizing gas flowing region 9 are configured so as to form parallel flows. As a result, the above-described operational advantages are obtained significantly.

In Embodiment 1, the first separator is the anode separator 6A; the second separator is the cathode separator 6B; the first reaction gas flowing region is the fuel gas flowing region 8; and the second reaction gas channel is the oxidizing gas flowing region 9. However, Embodiment 1 is not limited to this. As an alternative, the first separator may be the cathode separator 6B; the second separator may be the anode separator 6A; the first reaction gas flowing region may be the oxidizing gas flowing region 9; and the second reaction gas flowing region may be the fuel gas flowing region 8.

Although in Embodiment 1 the number of provided first recesses 48 is different from the number of provided second recesses 49, Embodiment 1 is not limited to this.

As an alternative, the number of provided first recesses 48 may be the same as the number of provided second recesses 49.

Further, in Embodiment 1, the oxidizing gas flowing region 9 is formed such that the number of channels upstream from the second recess 49 (i.e., the number of second straight line portions 19 upstream from the second recess 49) is the same as the number of channels downstream from the second recess 49 (i.e., the number of second straight line portions 19 downstream from the second recess 49). However, Embodiment 1 is not limited to this. For example, the oxidizing gas flowing region 9 may be formed such that the number of channels downstream from the second recess 49 (i.e., the number of second straight line portions 19 downstream from the second recess 49) is smaller than the number of channels upstream from the second recess 49 (i.e., the number of second straight line portions 19 upstream from the second recess 49).

[Variation 1]

Next, a variation of Embodiment 1 is described.

A polymer electrolyte fuel cell according to Variation 1 of Embodiment 1 serves as an example where all the first recesses provided in the first separator and all the second recesses provided in the second separator are arranged so as not to overlap with each other when seen in the thickness direction of the first separator.

[Configuration of Polymer Electrolyte Fuel Cell]

Figure 5:
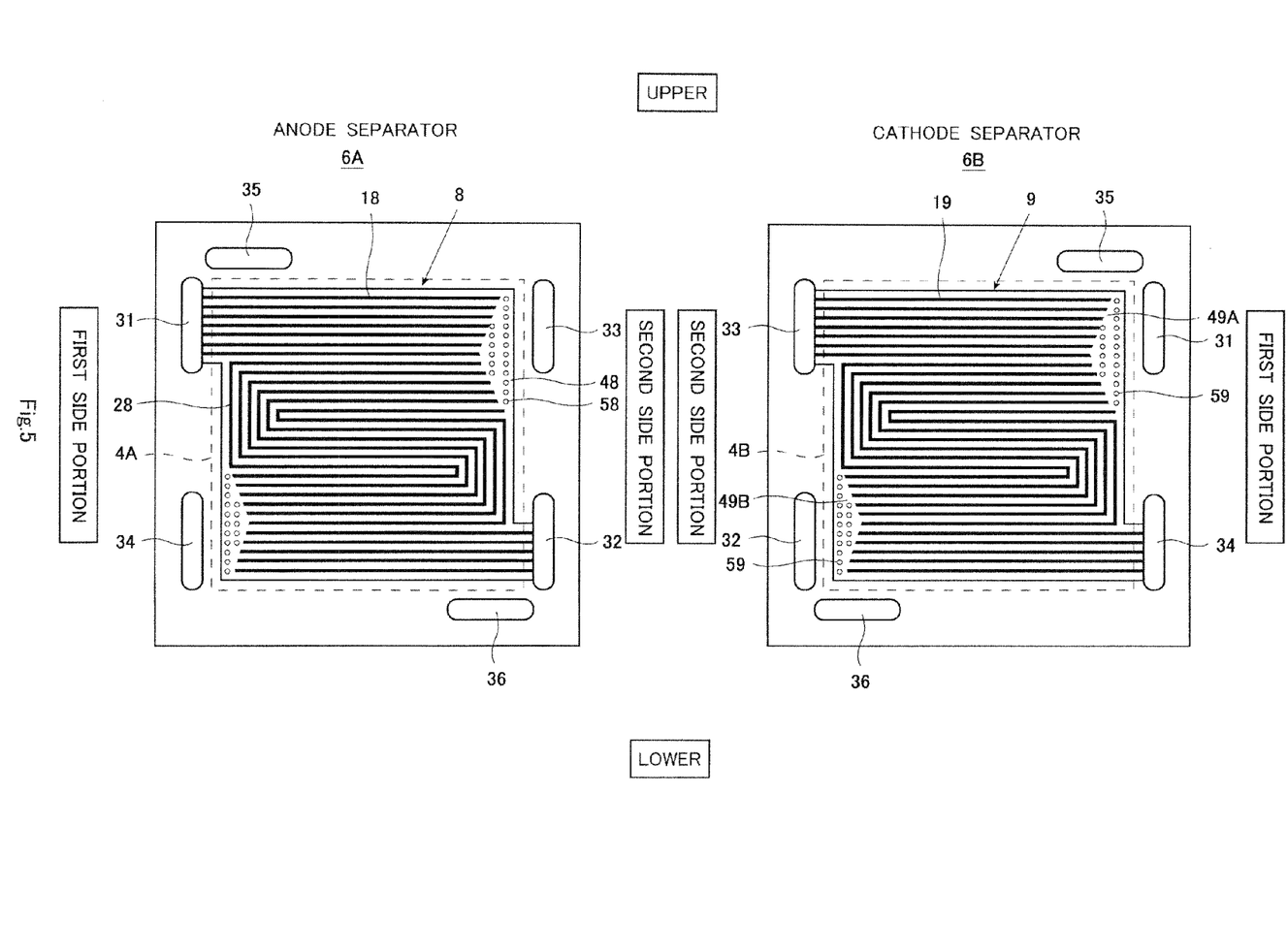
FIG. 5 is a schematic diagram showing schematic configurations of inner surfaces of anode and cathode separators in a polymer electrolyte fuel cell according to Variation 1 of Embodiment 1.

FIG. 5 is a schematic diagram showing schematic configurations of inner surfaces of anode and cathode separators in the polymer electrolyte fuel cell according to Variation 1 of Embodiment 1.

As shown in FIG. 5, the fundamental configuration of the fuel cell 100 according to Variation 1 is the same as that of the fuel cell 100 according to Embodiment 1, except for the configuration of the oxidizing gas flowing region 9. Specifically, the oxidizing gas flowing region 9 according to Variation 1 is different from the oxidizing gas flowing region 9 according to Embodiment 1, in that the oxidizing gas flowing region 9 according to Variation 1 includes a plurality of groove-shaped second straight line portions 19 and four second turn portions 29, and two among the four second turn portions 29 are provided with a second recess 49A and a second recess 49B, respectively.

The second recess 49A is provided at the second turn portion 29 that overlaps the cathode electrode 4B first when the oxidizing gas flowing region 9 seen in the thickness direction of the cathode separator 6B is followed from the upstream side to the downstream side. The second recess 49B is provided at the second turn portion 29 that overlaps the cathode electrode 4B first when the oxidizing gas flowing region 9 seen in the thickness direction of the cathode separator 6B is followed from the downstream side to the upstream side.

That is, the second recess 49A is provided at the second turn portion 29 that appears first when the oxidizing gas flowing region 9 seen in the thickness direction of the cathode separator 6B is followed from the upstream side to the downstream side, and the second recess 49B is provided at the second turn portion 29 that appears fourth when the oxidizing gas flowing region 9 seen in the thickness direction of the cathode separator 6B is followed from the upstream side to the downstream side.

As shown in FIG. 5, all the first recesses 48A and 48B (including the first projections 58) provided in the anode separator 6A, and all the second recesses 49A and 49B (including the second projections 59) provided in the cathode separator 6B, are arranged so as not to overlap with each other when seen in the thickness direction of the anode separator 6A.

According to the fuel cell 100 of Variation 1 with the above-described configuration, a decrease in the area of portions where there is no contact between the cathode separator 6B and the cathode electrode 4B, and a decrease in the area of portions where there is no contact between the anode separator 6A and the anode electrode 4A, can be further suppressed as compared to conventional fuel cells. This makes it possible to further reduce electrical contact resistance and further alleviate the concentration of electric power generation.

In the fuel cell 100 according to Variation 1, the oxidizing gas flowing region 9 is formed such that the number of channels downstream from the second recess 49 (i.e., the number of second straight line portions 19 downstream from the second recess 49) is smaller than the number of channels upstream from the second recess 49 (i.e., the number of second straight line portions 19 upstream from the second recess 49). With this configuration, the mixing and distributing of the oxidizing gas at the second recess 49 can be more facilitated in a case where any of the plurality of channels is blocked as mentioned above. This makes it possible to further suppress degradation in the cell performance due to insufficient supply of the oxidizing gas.

(Embodiment 2)

A fuel cell system according to Embodiment 2 serves as an example where the fuel cell system includes: the polymer electrolyte fuel cell according to Embodiment 1; a first reaction gas supply device configured to supply the first reaction gas to the first reaction gas flowing region; a second reaction gas supply device configured to supply the second reaction gas to the second reaction gas flowing region; a cooling medium supply device configured to supply the cooling medium to the cooling medium flowing region; and a controller configured to control the first reaction gas supply device, the second reaction gas supply device, and the cooling medium supply device, such that a dew point of the first reaction gas supplied to the first reaction gas flowing region and a dew point of the second reaction gas supplied to the second reaction gas flowing region become lower than a temperature of the cooling medium supplied to the cooling medium flowing region.

Hereinafter, one example of the fuel cell system according to Embodiment 2 is described with reference to the drawings.

[Configuration of Fuel Cell System]

Figure 6:
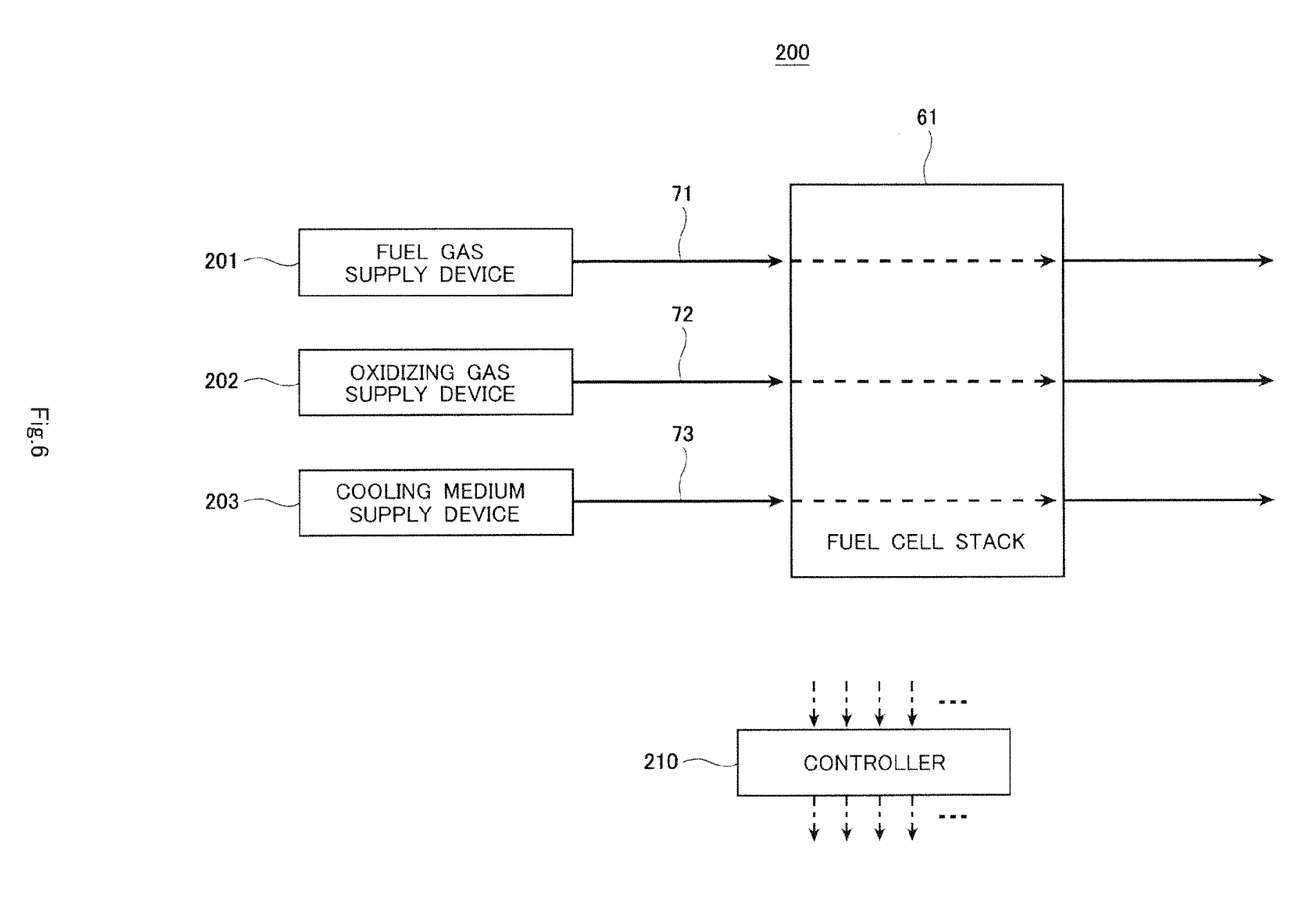
FIG. 6 is a block diagram showing a schematic configuration of a fuel cell system according to Embodiment 2.

FIG. 6 is a block diagram showing a schematic configuration of the fuel cell system according to Embodiment 2.

As shown in FIG. 6, a fuel cell system 200 according to Embodiment 2 includes: the fuel cell stack 61 including the fuel cells 100 according to Embodiment 1; a fuel gas supply device 201; an oxidizing gas supply device 202; a cooling medium supply device 203; and a controller 210. The controller 210 is configured to control the fuel gas supply device 201, the oxidizing gas supply device 202, and the cooling medium supply device 203, such that the dew point of the fuel gas flowing through the fuel gas flowing region 8 and the dew point of the oxidizing gas flowing through the oxidizing gas flowing region 9 are lower than the temperature of the cooling medium flowing through the cooling medium flowing region 10.

The fuel gas supply device 201 may be configured in any form, so long as the fuel gas supply device 201 is configured to supply the fuel gas (hydrogen gas) to the fuel cell stack 61 (the fuel cells 100) while adjusting the flow rate and humidity of the fuel gas. For example, the fuel gas supply device 201 may include: a hydrogen canister or a device configured to supply hydrogen gas from a hydrogen storage alloy or the like; and a total enthalpy heat exchanger or a humidifier configured to produce humidity by transforming water stored in a tank or the like into steam. Alternatively, a hydrogen generator configured to generate hydrogen gas by causing a reforming reaction between water and a raw material such as methane may serve as the fuel gas supply device 201. It should be noted that in a case where the fuel gas supply device 201 is configured as a hydrogen generator, the fuel gas supply device 201 may be configured as a hydrogen generator alone, or may be configured as a hydrogen generator provided with a humidifier or a total enthalpy heat exchanger.

The total enthalpy heat exchanger may be configured in any form, so long as the total enthalpy heat exchanger is configured to humidify the fuel gas supplied to the fuel gas flowing region 8. For example, a stationary total enthalpy heat exchanger may be used, which includes a stack of a plurality of cells, each of which includes a separator for flowing a primary fluid, a steam permeable membrane, and a separator for flowing a secondary fluid. In this case, the area of the steam permeable membrane or the number of cells to be stacked may be reduced, and thereby the amount of humidity for humidifying the fuel gas supplied to the fuel gas flowing region 8 may be reduced. In this manner, the dew point of the fuel gas flowing through the fuel gas flowing region 8 may be set to be lower than the temperature of the cooling medium flowing through the cooling medium flowing region 10.

The fuel cell stack 61 (specifically, the inlet of the fuel gas supply manifold 131) is connected to the fuel gas supply device 201 via a fuel gas supply passage 71. Accordingly, the fuel gas is supplied from the fuel gas supply device 201 to the fuel gas flowing region 8 through the fuel gas supply passage 71 and the fuel gas supply manifold 131.

The oxidizing gas supply device 202 may be configured in any form, so long as the oxidizing gas supply device 202 is configured to supply the oxidizing gas (air) to the fuel cell stack 61 (the fuel cells 100) while adjusting the flow rate and humidity of the oxidizing gas. For example, the oxidizing gas supply device 202 may include a humidifier and a fan device such as a fan or a blower. Alternatively, the oxidizing gas supply device 202 may include a fan device and a total enthalpy heat exchanger.

The total enthalpy heat exchanger may be configured in any form, so long as the total enthalpy heat exchanger is configured to humidify the oxidizing gas supplied to the oxidizing gas flowing region 9. For example, a stationary total enthalpy heat exchanger may be used, which includes a stack of a plurality of cells, each of which includes a separator for flowing a primary fluid, a steam permeable membrane, and a separator for flowing a secondary fluid. In this case, the area of the steam permeable membrane or the number of cells to be stacked may be reduced, and thereby the amount of humidity for humidifying the oxidizing gas supplied to the oxidizing gas flowing region 9 may be reduced. In this manner, the dew point of the oxidizing gas flowing through the oxidizing gas flowing region 9 may be set to be lower than the temperature of the cooling medium flowing through the cooling medium flowing region 10.

The fuel cell stack 61 (specifically, the inlet of the oxidizing gas supply manifold 133) is connected to the oxidizing gas supply device 202 via an oxidizing gas supply passage 72. Accordingly, the oxidizing gas is supplied from the oxidizing gas supply device 202 to the oxidizing gas flowing region 9 through the oxidizing gas supply passage 72 and the fuel gas discharge manifold 132.

The cooling medium supply device 203 may be configured in any form, so long as the cooling medium supply device 203 is configured to supply the cooling medium to the cooling medium flowing region 10 while adjusting the flow rate and temperature of the cooling medium. For example, the cooling medium supply device 203 may include a flow rate adjuster configured adjust a water flow rate and a temperature adjuster. The flow rate adjuster may be configured as a pump alone, or may be configured as a combination of a pump and a flow rate adjusting valve. The temperature adjuster may be configured as an electric heater, for example.

The fuel cell stack 61 (specifically, the cooling medium supply manifold 135) is connected to the cooling medium supply device 203 via a cooling medium supply passage 73. Accordingly, the cooling medium is supplied from the cooling medium supply device 203 to the cooling medium flowing region 10 through the cooling medium supply passage 73 and the cooling medium supply manifold 135.

The controller 210 may be configured as any device, so long as the device is configured to control component devices of the fuel cell system 200. The controller 210 includes: an arithmetic processing unit exemplified by a microprocessor, CPU, or the like; and a storage unit configured as a memory or the like storing programs for executing control operations. Through the loading and execution, by the arithmetic processing unit, of a predetermined control program stored in the storage unit, the controller 210 performs various controls of the fuel cell system 200.

The controller 210 may be configured not only as a single controller, but as a group of multiple controllers which operate in cooperation with each other to control the fuel cell system 200. Moreover, the controller 210 may be configured as a microcontroller. Furthermore, the controller 210 may be configured as an MPU, PLC (Programmable Logic Controller), logic circuit, or the like.

It should be noted that the controller 210 may control (reduce) the operating amount of the flow rate adjuster of the cooling medium supply device 203 to reduce the flow rate of the cooling medium flowing through the cooling medium flowing region 10, thereby setting the dew point of the fuel gas flowing through the fuel gas flowing region 8 and the dew point of the oxidizing gas flowing through the oxidizing gas flowing region 9 to be lower than the temperature of the cooling medium flowing through the cooling medium flowing region 10. Alternatively, the controller 210 may control (increase) the operating amount of the temperature adjuster to increase the temperature of the cooling medium flowing through the cooling medium flowing region 10, thereby setting the dew point of the fuel gas flowing through the fuel gas flowing region 8 and the dew point of the oxidizing gas flowing through the oxidizing gas flowing region 9 to be lower than the temperature of the cooling medium flowing through the cooling medium flowing region 10.

The fuel cell system 200 according to Embodiment 2 with the above-described configuration includes the fuel cell 100 according to Embodiment 1. Therefore, the fuel cell system 200 according to Embodiment 2 provides the same operational advantages as those of the fuel cell 100 according to Embodiment 1. In particular, the fuel cell system 200 according to Embodiment 2 is configured such that the fuel cell 100 operates under low-humidity condition. As a result, the operational advantages are obtained significantly.

Although Embodiment 2 includes the fuel cell 100 according to Embodiment 1, Embodiment 2 may alternatively include the fuel cell 100 according to Variation 1 of Embodiment 1.

From the foregoing description, numerous modifications and other embodiments of the present invention are obvious to one skilled in the art. Therefore, the foregoing description should be interpreted only as an example and is provided for the purpose of teaching the best mode for carrying out the present invention to one skilled in the art. The configurations and/or functional details may be substantially altered without departing from the spirit of the present invention. In addition, various inventions can be made by suitable combinations of a plurality of components disclosed in the above embodiments.

INDUSTRIAL APPLICABILITY

The polymer electrolyte fuel cell and the fuel cell system including the polymer electrolyte fuel cell according to the present invention are useful in technical fields of fuel cells since they are capable of reducing, as compared to conventional fuel cells, electrical contact resistance between the separators and electrodes at the turn portions provided with the recesses and projections.

REFERENCE SIGNS LIST

1 polymer electrolyte membrane (electrolyte layer)
2A anode catalyst layer
2B cathode catalyst layer 3A anode gas diffusion layer
3B cathode gas diffusion layer
4A anode electrode (electrode)
4B cathode electrode (electrode)
5 MEA (Membrane-Electrode-Assembly: electrolyte layer-electrode assembly)
6A anode separator (first separator)
6B cathode separator (second separator)
7 gasket
8 fuel gas flowing region
9 oxidizing gas flowing region
10 cooling medium flowing region
11 first rib
12 second rib
18 first straight line portion
19 second straight line portion
28 first turn portion
29 second turn portion
31 fuel gas supply manifold hole
32 fuel gas discharge manifold hole
33 oxidizing gas supply manifold hole
34 oxidizing gas discharge manifold hole
35 cooling medium supply manifold hole
36 cooling medium discharge manifold hole
48 first recess
59 second recess
58 first projection
59 second projection
61 fuel cell stack
62 cell stacked body
63 end plate
64 end plate
71 fuel gas supply passage
72 oxidizing gas supply passage
73 cooling medium supply passage
100 fuel cell
131 fuel gas supply manifold
132 fuel gas discharge manifold
133 oxidizing gas supply manifold
134 oxidizing gas discharge manifold
135 cooling medium supply manifold
136 cooling medium discharge manifold
200 fuel cell system
201 fuel gas supply device
202 oxidizing gas supply device
203 cooling medium supply device
210 controller

The invention claimed is:

1. A polymer electrolyte fuel cell comprising:
an electrolyte layer-electrode assembly including an electrolyte layer and a pair of electrodes sandwiching the electrolyte layer;
a plate-shaped electrically conductive first separator disposed so as to be in contact with one electrode of the pair of electrodes of the electrolyte layer-electrode assembly, wherein one main surface of the first separator is in contact with the one electrode, the one main surface having a first reaction gas flowing region which is formed in a winding shape and through which a first reaction gas flows, the first reaction gas flowing region including a plurality of groove-shaped first straight line portions and one or more first turn portions; and
a plate-shaped electrically conductive second separator disposed so as to be in contact with another electrode of the pair of electrodes of the electrolyte layer-electrode assembly, wherein one main surface of the second separator is in contact with the other electrode, the one main surface being provided with a second reaction gas flowing region which is formed in a winding shape and through which a second reaction gas flows, the second reaction gas flowing region including a plurality of groove-shaped second straight line portions and one or more second turn portions, wherein:
in the first separator, among the one or more first turn portions, at least a most upstream first turn portion has a first recess and a plurality of first projections rising from a bottom surface of the first recess,
in the second separator, among the one or more second turn portions, at least one second turn portion has a second recess and a plurality of second projections rising from a bottom surface of the second recess, and
when seen in a thickness direction of the first separator, the first and second recesses overlap with each other, and an overlap area is more than 0% and less than or equal to 5% of a gross area, the overlap area being a total overlap area between the first and second recesses and second separators, the gross area being a total of the following areas: an area of all the first recesses of the first separator; and an area of all the second recesses of the second separator.

2. The polymer electrolyte fuel cell according to claim 1, wherein
the first reaction gas flowing region and the second reaction gas flowing region are configured such that
the first reaction gas flowing region and the second reaction gas flowing region form parallel flows, and
when seen in the thickness direction of the first separator, the first reaction gas flowing through the first straight line portions that overlap the one electrode first when the first reaction gas flowing region is followed from upstream to downstream, and the second reaction gas flowing through the second straight line portions that overlap the other electrode first when the second reaction gas flowing region is followed from upstream to downstream, flow in opposite directions to each other,
the first recess is located on the first turn portion that overlaps the one electrode first when the first reaction gas flowing region seen in the thickness direction of the first separator is followed from upstream to downstream, and
the second recess is located on the second turn portion that overlaps the other electrode first when the second reaction gas flowing region seen in a thickness direction of the second separator is followed from upstream to downstream.

3. The polymer electrolyte fuel cell according to claim 1, wherein
the number of second recesses is greater than the number of first recesses.

4. The polymer electrolyte fuel cell according to claim 1, wherein
another main surface of at least one of the first and second separators, the other main surface not being in contact with any of the electrodes, has a cooling medium flowing region through which a cooling medium flows.

5. A fuel cell system comprising:
the polymer electrolyte fuel cell according to claim 4;
a first reaction gas supply device configured to supply the first reaction gas to the first reaction gas flowing region;
a second reaction gas supply device configured to supply the second reaction gas to the second reaction gas flowing region;

a cooling medium supply device configured to supply the cooling medium to the cooling medium flowing region; and a controller configured to control the first reaction gas supply device, the second reaction gas supply device, and the cooling medium supply device, such that a dew point of the first reaction gas supplied to the first reaction gas flowing region and a dew point of the second reaction gas supplied to the second reaction gas flowing region become lower than a temperature of the cooling medium supplied to the cooling medium flowing region.

* * * * *